US012244033B2

(12) United States Patent
Jeon et al.

(10) Patent No.: US 12,244,033 B2
(45) Date of Patent: Mar. 4, 2025

(54) BATTERY PACK, ELECTRONIC DEVICE AND VEHICLE

(71) Applicant: LG Energy Solution, Ltd., Seoul (KR)

(72) Inventors: Byeong-Jun Jeon, Daejeon (KR); Young-Su Son, Daejeon (KR); Bum-Jick Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 483 days.

(21) Appl. No.: 17/761,031

(22) PCT Filed: Jan. 7, 2021

(86) PCT No.: PCT/KR2021/000220
§ 371 (c)(1),
(2) Date: Mar. 16, 2022

(87) PCT Pub. No.: WO2021/141423
PCT Pub. Date: Jul. 15, 2021

(65) Prior Publication Data
US 2022/0336908 A1 Oct. 20, 2022

(30) Foreign Application Priority Data
Jan. 8, 2020 (KR) .................. 10-2020-0002621

(51) Int. Cl.
*H01M 50/284* (2021.01)
*B60L 50/64* (2019.01)
(Continued)

(52) U.S. Cl.
CPC .......... *H01M 50/284* (2021.01); *B60L 50/64* (2019.02); *H01M 10/425* (2013.01);
(Continued)

(58) Field of Classification Search
CPC .......... B60L 50/64; B60L 50/00; B60L 50/50; B60L 50/60; H01M 10/425;
(Continued)

(56) References Cited

U.S. PATENT DOCUMENTS 8,114,527 B2 * 2/2012 Nagasawa .............. C09D 5/106
428/548
8,609,276 B2 * 12/2013 Han ..................... H01M 50/553
429/170
(Continued)

FOREIGN PATENT DOCUMENTS

| CN | 102097646 A | 6/2011 |
| CN | 208986131 U | 6/2019 |

(Continued)

OTHER PUBLICATIONS

Korean Office Action issued in corresponding KR Application No. 10-2021-0001894, dated Apr. 8, 2024. Note: JP 2009-130260 A and JP 2005-167112 A were previously cited.

(Continued)

*Primary Examiner* — James M Dolak
(74) *Attorney, Agent, or Firm* — Morgan, Lewis & Bockius LLP

(57) ABSTRACT

Disclosed is a battery pack with improved durability and inner space efficiency to increase energy density. The battery pack includes a plurality of battery cells; a battery management unit configured to manage charging and discharging of the plurality of battery cells and including at least two printed circuit boards electrically connected to each other and arranged such that such that surfaces of the at least two printed circuit boards face each other; and an electrically insulating pack housing having an inner space in which the
(Continued)

plurality of battery cells are accommodated and having a fixing unit being configured to fix the at least two printed circuit boards.

8 Claims, 7 Drawing Sheets

(51) Int. Cl.
*H01M 10/42* (2006.01)
*H01M 50/213* (2021.01)
*H01M 50/233* (2021.01)
*H01M 50/249* (2021.01)

(52) U.S. Cl.
CPC ....... *H01M 50/213* (2021.01); *H01M 50/233* (2021.01); *H01M 50/249* (2021.01); *H01M 2010/4271* (2013.01); *H01M 2220/20* (2013.01)

(58) Field of Classification Search
CPC ......... H01M 10/4207; H01M 10/4257; H01M 10/42; H01M 10/00; H01M 2010/4271; H01M 2220/20; H01M 50/284; H01M 50/213; H01M 50/233; H01M 50/249; H01M 50/204; H01M 50/519; H01M 50/24; H01M 50/20; H01M 50/287
See application file for complete search history.

(56) References Cited

U.S. PATENT DOCUMENTS

| | | | | |
|---|---|---|---|---|
| 8,647,764 | B2* | 2/2014 | Naito | H01M 50/213 |
| | | | | 429/153 |
| 9,017,855 | B2* | 4/2015 | Park | H01M 50/296 |
| | | | | 429/154 |
| 9,438,113 | B2* | 9/2016 | Wyatt | B60L 1/00 |
| 9,786,967 | B2* | 10/2017 | Smith | H01M 10/6563 |
| 10,608,292 | B2* | 3/2020 | Yang | H01M 10/643 |
| 10,615,394 | B2* | 4/2020 | Miyawaki | H01M 50/553 |
| 10,720,616 | B2* | 7/2020 | Seol | H01M 50/581 |
| 10,910,616 | B2* | 2/2021 | Choi | H01M 10/425 |
| 11,411,264 | B1* | 8/2022 | Wang | H01M 10/623 |
| 11,431,051 | B2* | 8/2022 | Nakari | H01M 50/296 |
| 11,973,203 | B2* | 4/2024 | Son | H01M 10/653 |
| 11,973,244 | B2* | 4/2024 | Lee | H01M 50/271 |
| 12,080,904 | B2* | 9/2024 | Liu | H01M 50/24 |
| 12,080,914 | B2* | 9/2024 | Takahashi | H01M 50/50 |
| 12,085,620 | B2* | 9/2024 | Wang | G01R 31/3865 |
| 12,103,426 | B2* | 10/2024 | Shiraishi | H01M 10/48 |
| 12,113,243 | B2* | 10/2024 | Takahashi | H05K 1/189 |
| 12,132,183 | B2* | 10/2024 | Götz | H01M 50/284 |
| 12,148,943 | B2* | 11/2024 | George | H01M 50/505 |
| 12,155,082 | B2* | 11/2024 | Miyawaki | H01G 11/76 |
| 2007/0264562 | A1 | 11/2007 | Kang et al. | |
| 2011/0101920 | A1* | 5/2011 | Seo | H02J 7/005 |
| | | | | 429/61 |
| 2014/0178715 | A1 | 6/2014 | Koh | |
| 2015/0035370 | A1 | 2/2015 | Wyatt et al. | |
| 2015/0349392 | A1 | 12/2015 | Smith et al. | |
| 2016/0164054 | A1* | 6/2016 | Yamamoto | H01M 50/516 |
| | | | | 429/61 |
| 2017/0133723 | A1 | 5/2017 | Yang et al. | |
| 2020/0006727 | A1 | 1/2020 | Nakari et al. | |
| 2021/0057690 | A1 | 2/2021 | Fukutome et al. | |

FOREIGN PATENT DOCUMENTS

| | | |
|---|---|---|
| CN | 110660952 A | 1/2020 |
| EP | 2 325 920 A2 | 5/2011 |
| EP | 3 048 001 A1 | 7/2016 |
| JP | H06-62591 U | 9/1994 |
| JP | H09-283883 A | 10/1997 |
| JP | 2005-167112 A | 6/2005 |
| JP | 2009-130260 A | 6/2009 |
| JP | 2012-089757 A | 5/2012 |
| JP | 2014-123553 A | 7/2014 |
| JP | 2016-018651 A | 2/2016 |
| KR | 10-2007-0068608 A | 7/2007 |
| KR | 10-2009-0090546 A | 8/2009 |
| KR | 10-2015-0034495 A | 4/2015 |
| KR | 10-2017-0011001 A | 2/2017 |
| KR | 10-2017-0011518 A | 2/2017 |
| KR | 10-2017-0141370 A | 12/2017 |
| KR | 10-2018-0106067 A | 10/2018 |
| WO | 2018/055702 A1 | 3/2018 |
| WO | 2019/163549 A1 | 8/2019 |

OTHER PUBLICATIONS

International Search Report and Written Opinion issued in corresponding International Patent Application No. PCT/KR2021/000220 dated Apr. 26, 2021.

Extended European Search Report issued in corresponding European Patent Application No. 21738898 dated May 10, 2023. Note: JP 2009-130260 and JP 2005-167112 cited therein are already of record.

Office Action issued in corresponding Chinese Patent Application No. 202180005281.8, dated Jul. 29, 2023. (Note: JP 2009-130260 A, JP H09283883 A, WO 2018/055702 A1, JP 2005-167112 A, WO 2019/163549 A1 have been previously cited).

Office Action issued in corresponding Japanese Patent Application No. 2022-510191 dated Mar. 27, 2023.

* cited by examiner

BATTERY PACK, ELECTRONIC DEVICE AND VEHICLE

TECHNICAL FIELD

The present disclosure relates to a battery pack, an electronic device, and a vehicle, and more particularly, to a battery pack with improved durability and inner space efficiency to increase energy density.

The present application claims priority to Korean Patent Application No. 10-2020-0002621 filed on Jan. 8, 2020 in the Republic of Korea, the disclosures of which are incorporated herein by reference.

BACKGROUND ART

Recently, a secondary battery capable of charging and discharging has been widely used as an energy source for wireless mobile devices. In addition, the secondary battery is attracting attention as a power source of an electric vehicle (EV), a hybrid electric vehicle (HEV), or the like, which is proposed as a solution to air pollution by existing gasoline vehicles and diesel vehicles that use fossil fuels.

One small mobile device uses one battery cell or two or more battery cells, but a medium-sized or large-sized device such as a vehicle uses a medium-sized or large-sized battery module in which a plurality of battery cells are electrically connected, due to the need for high-power and large-capacity, or sometimes uses a battery pack implemented by connecting a plurality of battery modules.

Since the battery pack is preferably manufactured with a small size and weight as possible, rectangular batteries, pouch-type batteries, or the like capable of being stacked with a high degree of integration and having a small weight-to-capacity are mainly used as battery cells applied to the battery pack.

In addition, in order for the battery pack to provide the output and capacity required by a predetermined instrument or device, it is necessary to electrically connect a plurality of battery cells in series, in parallel, or in combination of series and parallel. For example, electrode terminals of the battery cells in the battery pack may be welded to a plurality of bus bar plates provided in the form of a metal plate so as to be electrically connected in series, in parallel, or in combination of series and parallel.

Moreover, since the battery pack has a structure in which a plurality of battery cells are combined, a sensing means capable of sensing the current generated from the battery cells is required in order to detect the case where overvoltage, overcurrent or overheating occurs at some battery cells. The sensing means may be individually connected to the battery cells to provide voltage/current information of the battery cells to a battery management unit.

The battery management unit may include a printed circuit board in which a printed circuit is embedded. In addition, the battery management unit includes a connector mounted to a printed circuit board in order to exchange signals with an external device, or to charge the battery cell by receiving power from the outside, or to discharge the battery cell by supplying power to an external device.

Recently, a battery management unit applied to a high-capacity, high-current battery pack needs to include various control elements on a printed circuit board for efficient charging and discharging. Accordingly, the need to further increase the size of the printed circuit board is increasing.

However, the battery pack mounted in a limited space such as a vehicle needs to accommodate a large amount of battery cells in a limited inner space, and thus there is a problem that the energy density of the battery pack decreases as the volume occupied by the battery management unit increases. In particular, the printed circuit board of the battery management unit has a board shape that extends in a horizontal direction, so there are a lot of space limitations in arranging the battery management unit, unlike other components. Accordingly, the battery management unit acts as a large obstacle in reducing the size of the battery pack.

DISCLOSURE

Technical Problem

The present disclosure is designed to solve the problems of the related art, and therefore the present disclosure is directed to providing a battery pack with improved durability and inner space efficiency to increase energy density.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
  a plurality of battery cells;
  a battery management unit configured to manage charging and discharging of the plurality of battery cells and including at least two printed circuit boards electrically connected to each other and arranged such that relatively broad surfaces thereof face each other; and
  a pack housing having electric insulation and having an inner space in which the plurality of battery cells are accommodated and having a fixing unit being configured to fix the at least two printed circuit boards.
Also, the battery management unit may include:
  a first printed circuit board mounted on the pack housing and having a first perforated hole formed therein; and
  a second printed circuit board located to be spaced apart from the first printed circuit board by a predetermined distance and having a second perforated hole formed therein,
  wherein the fixing unit may include:
  at least one fixing pillar having a body configured to pass through the first perforated hole and the second perforated hole of the first printed circuit board and the second printed circuit board, respectively, the fixing pillar having a mounting groove formed at a longitudinal end of the body; and
  a screw inserted and fastened into the second perforated hole and the mounting groove to fix the first printed circuit board and the second printed circuit board to the fixing pillar, respectively.

Moreover, the first perforated hole of the first printed circuit board may have a larger diameter than the second perforated hole of the second printed circuit board, and
  the longitudinal end of the fixing pillar may have a smaller diameter than a lower end of the fixing pillar.

In addition, the fixing pillar may include a stopper having a larger diameter than the second perforated hole of the second printed circuit board.

Further, the first printed circuit board may have a fixing hole into which the screw is inserted, and the pack housing may have a fixing groove into which a part of the screw inserted into the fixing hole is inserted and fastened.

Also, at least one of the first printed circuit board and the second printed circuit board may include an electrically insulating coating layer formed on an outer surface thereof.

Moreover, the battery pack may further comprise a BMS housing configured to cover the first printed circuit board and the second printed circuit board.

Further, in another aspect of the present disclosure, there is also provided an electronic device, comprising the battery pack.

In addition, in another aspect of the present disclosure, there is also provided a vehicle, comprising the battery pack.

Advantageous Effects

According to an embodiment of the present disclosure, since the battery management unit is configured to manage charging and discharging of the plurality of battery cells and includes at least two printed circuit boards arranged such that that relatively broad surfaces thereof face each other and electrically connected to each other, even though a conventional battery management unit including one printed circuit board inevitably needs to secure a wide space in a horizontal direction inside the inner space of the pack housing, as the battery management unit is configured by dividing the board into at least two printed circuit boards, it is possible to increase the utilization of the inner space of the battery pack, thereby ultimately configuring the battery pack more compactly.

Also, according to an embodiment of the present disclosure, the fixing unit may securely fix the printed circuit boards to the upper portion of the pack housing by inserting the at least one fixing pillar into the first perforated hole and the second perforated hole of the first printed circuit board and the second printed circuit board, respectively. Moreover, it is possible to fix the second printed circuit board located at the upper portion of the fixing pillar not to move by using the screw. Accordingly, durability of the battery pack may be effectively increased.

Moreover, according to an embodiment of the present disclosure, since the first perforated hole of the first printed circuit board has a larger diameter than the second perforated hole of the second printed circuit board and the longitudinal end of the fixing pillar has a smaller diameter than the lower of the fixing pillar, the first printed circuit board and the second printed circuit board may be disposed to be spaced apart from each other by a predetermined distance just by inserting the first printed circuit board and the second printed circuit board into the fixing pillar, respectively. Accordingly, it is possible to increase the assembly efficiency of the battery pack and reduce production cost.

In addition, according to an embodiment of the present disclosure, since the fixing pillar includes the stopper having a larger diameter than the second perforated hole of the second printed circuit board, it is possible to fix the second printed circuit board more stably. That is, compared to the case where the fixing pillar is formed only with a tapered structure whose diameter decreases upward, the stopper formed as above may stably prevent the second printed circuit board from moving in an insertion direction. Accordingly, the second printed circuit board may be precisely positioned at an intended location, and the movement of the second printed circuit board may be effectively reduced.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
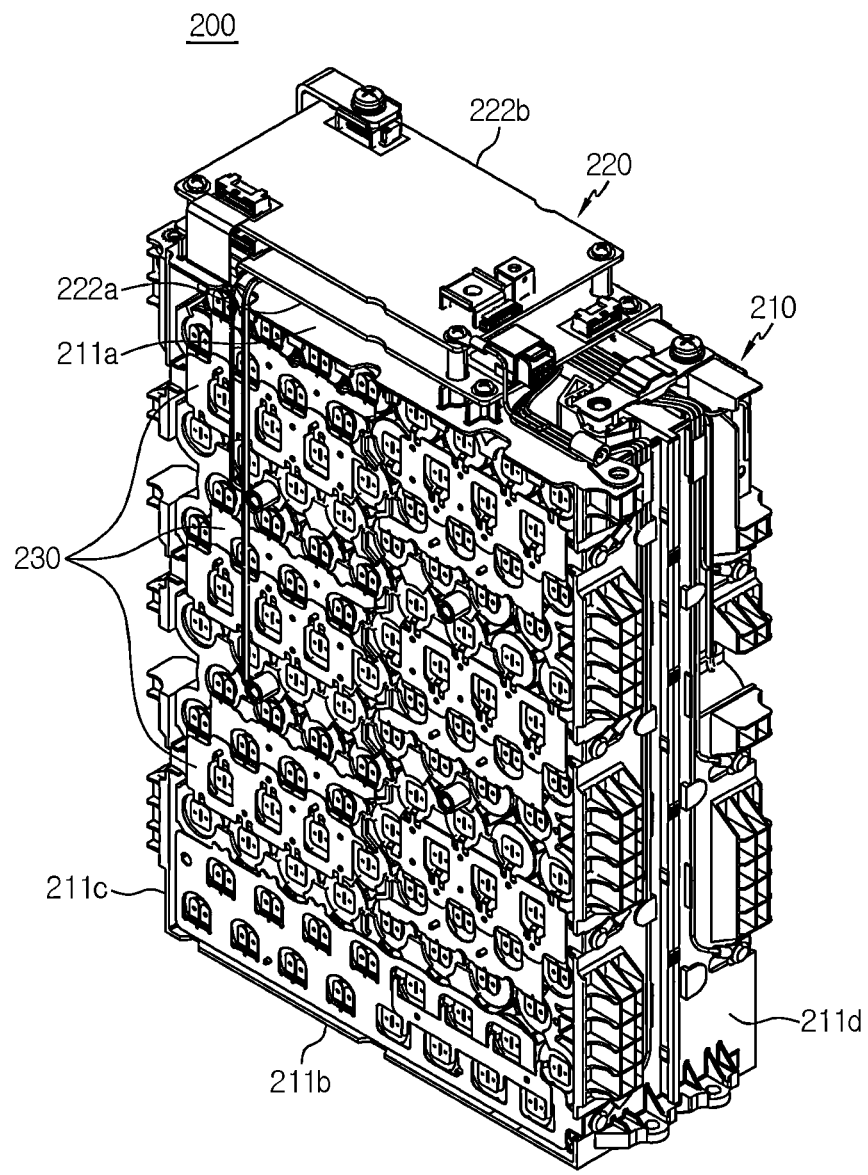
FIG. 1 is a perspective view schematically showing a battery pack according to an embodiment of the present disclosure.
Figure 2:
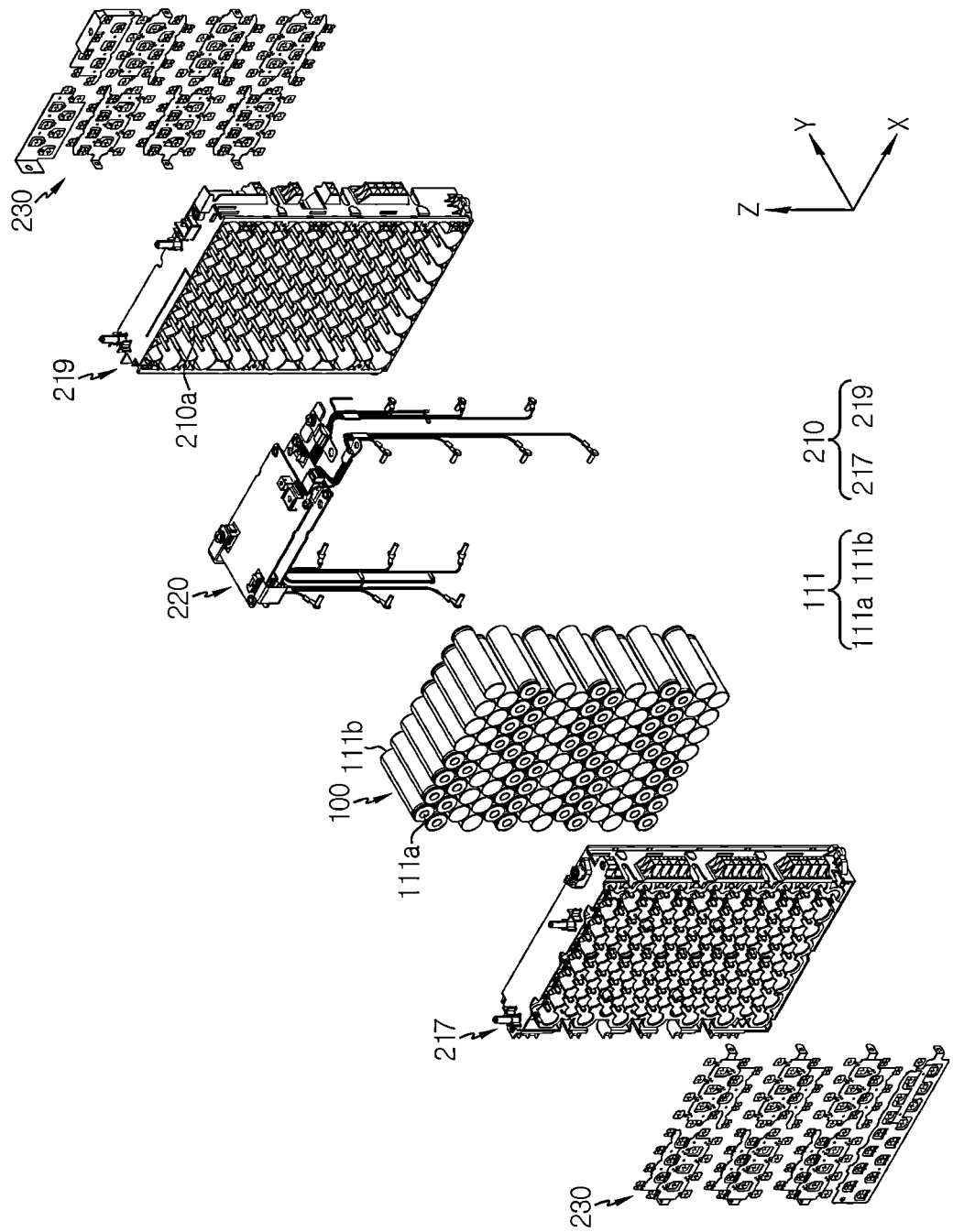
FIG. 2 is an exploded perspective view schematically showing some components of the battery pack according to an embodiment of the present disclosure.

FIG. 1 is a perspective view schematically showing a battery pack according to an embodiment of the present disclosure. FIG. 2 is an exploded perspective view schematically showing some components of the battery pack according to an embodiment of the present disclosure. Also, FIG. 3 is a sectional view schematically showing a battery cell of the battery pack according to an embodiment of the present disclosure.

Figure 3:
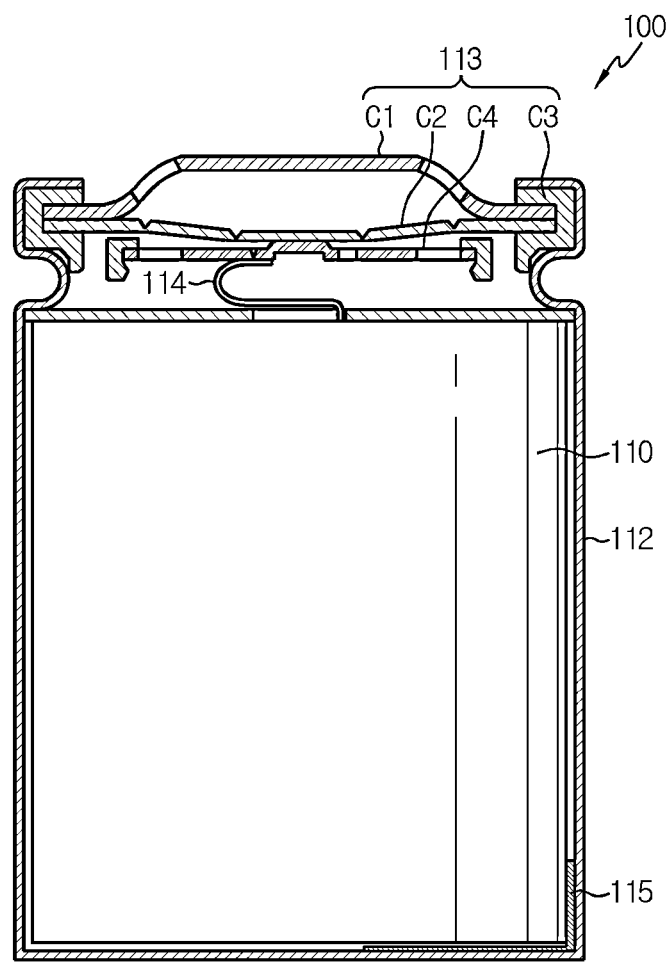
FIG. 3 is a sectional view schematically showing a battery cell of the battery pack according to an embodiment of the present disclosure.

Referring to FIGS. 1 to 3, a battery pack 200 of the present disclosure includes a plurality of battery cells 100, a battery management unit 220, and a pack housing 210.

Here, the plurality of battery cells 100 may be secondary batteries capable of charging and discharging. The battery cell 100 may be a can-type battery cell. Here, the battery cell 100 may include an electrode assembly 110, a battery can 112, and a cap assembly 113.

The electrode assembly 110 may have a structure in which a positive electrode plate and a negative electrode plate are wound with a separator being interposed therebetween. Also, a positive electrode tab 114 may be attached to the positive electrode plate to be connected to the cap assembly 113, and a negative electrode tab 115 may be attached to negative electrode plate to be connected to a lower end of the battery can 112.

The battery can 112 may have an empty space formed therein so that the electrode assembly 110 is accommodated therein. In particular, the battery can 112 may be configured in a cylindrical or rectangular shape with an open top. In addition, the battery can 112 may be made of a metal material such as steel or aluminum to secure rigidity. In addition, the negative electrode tab may be attached to the lower end of the battery can 112 so that not only a lower part of the battery can 112 but also the battery can 112 itself may function as a negative electrode terminal.

The cap assembly 113 may be coupled to the open top of the battery can 112 to seal the open end of the battery can 112. The cap assembly 113 may have a circular shape or a rectangular shape according to the shape of the battery can 112, and may include sub-components such as a top cap C1, a safety vent C2 and a gasket C3.

Here, the top cap C1 is positioned at the top of the cap assembly 113 and may be configured to protrude in an upper direction. In particular, the top cap C1 may function as a positive electrode terminal in the battery cell. Therefore, the top cap C1 may be electrically connected to another battery cell 100 or a charging device through an external device such as a bus bar plate 230. The top cap C1 may be made of a metal material such as stainless steel or aluminum, for example.

The safety vent C2 may be configured to change its structure when an internal pressure of the battery cell 100, namely an internal pressure of the battery can 112, increases over a certain level. In addition, the gasket C3 may be made of a material with electrical insulation so that edge portions of the top cap C1 and the safety vent C2 are insulated from the battery can 112.

Meanwhile, the cap assembly 113 may further include a current interrupt member C4. The current interrupt member C4 is also called CID (Current Interrupt Device). If the shape of the safety vent C2 is reversed as internal pressure of the battery increases due to gas generation, the contact between the safety vent C2 and the current interrupt member C4 is cut off, or the current interrupt member C4 is damaged, thereby cutting the electrical connection between the safety vent C2 and the electrode assembly 110.

The configuration of the battery cell 100 is widely known to those skilled in the art at the time of filing of this application and thus will not be described in detail in this specification. In addition, although an example of the battery cell 100 is shown in FIG. 3, the battery pack 200 according to the present disclosure is not limited to a specific configuration of the battery cell 100. That is, various battery cells 100 known at the time of filing of this application may be employed in the battery pack 300 according to the present disclosure.

Figure 4:
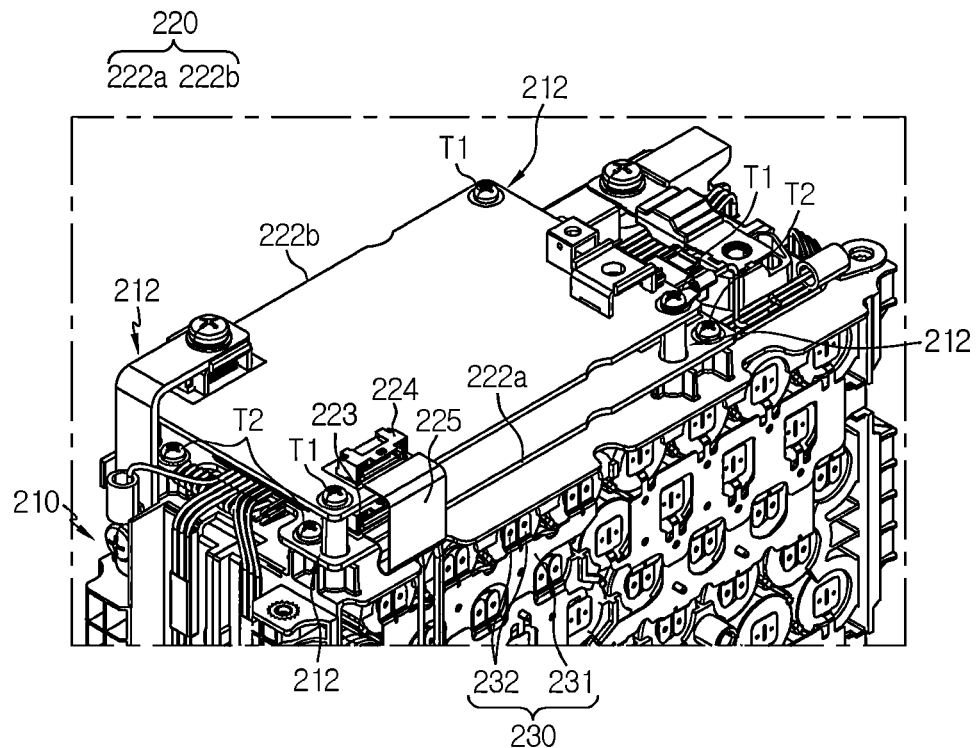
FIG. 4 is a partial perspective view schematically showing an upper portion of the battery pack according to an embodiment of the present disclosure in an enlarged form.

FIG. 4 is a partial perspective view schematically showing an upper portion of the battery pack according to an embodiment of the present disclosure in an enlarged form.

Referring to FIG. 4 along with FIG. 2, the battery management unit 220 may include various components for controlling charging and discharging of the plurality of battery cells 100.

For example, the battery management unit 220 may include at least two printed circuit boards 222a, 222b. The at least two printed circuit boards 222a, 222b may be arranged such that relatively broad surfaces thereof face each other. Here, the 'relatively broad surface' means a surface having a relatively larger area than the other surface of the board. For example, upper and lower surfaces of the printed circuit board 222a may have a larger area than front, rear, left and right surfaces thereof in a horizontal direction.

For example, as shown in FIG. 4, at least two printed circuit boards 222a, 222b may be located on the pack housing 210. Each of the at least two printed circuit boards 222a, 222b may have a substrate extending in a horizontal direction (X and Y directions in FIG. 2). That is, the upper surface and the lower surface of each of the at least two printed circuit boards 222a, 222b may have a larger area than side surfaces in a horizontal direction.

In addition, the at least two printed circuit boards 222a, 222b may be electrically connected to each other. The at least two printed circuit boards 222a, 222b may be connected to each other via a flexible flat cable connector 225 having a thin film type cable. At this time, the two or more printed circuit boards 222a, 222b may include connectors 223, 224 having connection terminals that make male and female connection with connection terminals located at both ends of the flexible flat cable connector 225, respectively.

Moreover, the printed circuit boards 222a, 222b may be configured to control charging and discharging of the battery by turning on/off a switch element (not shown) according to the charging or discharging state of the plurality of battery cells 100.

In addition, the printed circuit boards 222a, 222b may include a plurality of insulation layers (not shown) and a plurality of conductive material layers interposed between the plurality of insulation layers (not shown). In addition, each of the printed circuit boards 222a, 222b may include a printed circuit (not shown) made of a conductive material layer.

Meanwhile, referring to FIGS. 1, 2 and 4 again, the pack housing 210 may have an inner space formed therein to accommodate the plurality of battery cells 100.

Specifically, the pack housing 210 may include an electrically insulating material. For example, the pack housing 210 may have a plastic material such as polyvinyl chloride. The pack housing 210 may include outer walls 211a, 211b, 211c, 211d at upper, lower, left and right ends thereof, respectively.

In addition, the pack housing 210 may include a first case 217 and a second case 219. In addition, a plurality of hollow structures 210a may be formed at the first case 217 and the second case 219 to surround an outer surface of the upper or lower portion of the cylindrical battery cell 100 so that the cylindrical battery cell 100 may be accommodated therein.

Moreover, the first case 217 and the second case 219 may be configured such that a rear portion of the first case 217 and a front portion of the second case 219 are coupled to each other. At this time, the front and rear directions are set to a negative direction and a positive direction of the Y-axis direction of FIG. 2.

In addition, a fixing unit 212 for fixing the at least two printed circuit boards 222a, 222b may be provided at the upper portion of the pack housing 210. For example, as shown in FIG. 4, the pack housing 210 may include four fixing units 212. The four fixing units 212 may be configured such that the at least two printed circuit boards 222a, 222b are fixed to the upper portion of the pack housing 210 at locations spaced apart from each other by a predetermined distance.

Therefore, according to this configuration of the present disclosure, since the battery management unit 220 is configured to manage charging and discharging of the plurality of battery cells 100 and includes at least two printed circuit boards 222a, 222b arranged such that that relatively broad surfaces thereof face each other and electrically connected to each other, even though a conventional battery management unit including one printed circuit board inevitably needs to secure a wide space in a horizontal direction inside the inner space of the pack housing, as the battery management unit 220 is configured by dividing the board into at least two printed circuit boards 222a, 222b, it is possible to increase the utilization of the inner space of the battery pack 200, thereby ultimately configuring the battery pack 200 more compactly.

Further, referring to FIG. 4 again along with FIG. 2, the bus bar plate 230 may be configured to contact each of electrode terminals 111a, 111b of the plurality of battery cells 100 to electrically connect the plurality of battery cells 100 to each other.

To this end, at least a portion of the bus bar plate 230 may be made of an electrically conductive material. For example, the bus bar plate 230 may be made of a metal material such as copper, aluminum and nickel.

Specifically, the bus bar plate 230 may have a plate shape. In addition, the bus bar plate 230 may include an electrically conductive metal material. Moreover, the bus bar plate 230 may include a body portion 231 and a connection portion 232. The body portion 231 may have a plate shape extending in upper, lower, front or rear directions. The connection portion 232 may have a shape extending from the body portion 231. The connection portion 232 may be configured to protrude inward (toward the electrode terminal) to electrically connect the plurality of battery cells 100 to each other.

In addition, in the present disclosure, the bus bar plate 230 may be configured in a plate shape, as shown in FIG. 2. Moreover, the bus bar plate 230 may be configured in the form of a metal plate to ensure rigidity and electrical conductivity. In particular, the bus bar plate 230 may be configured to be erected in an upper and lower direction (Z-axis direction in the drawing) along the electrode terminals 111 of the plurality of battery cells 100.

That is, in the present disclosure, if the plurality of battery cells 100 are arranged in a left and right direction (X-axis direction in the drawing) and/or an upper and lower direction (Z-axis direction in the drawing) in the form of being laid down long in a front and rear direction (Y-axis direction in FIG. 2), the electrode terminals 111 of several battery cells 100 may be located at both ends in the front and rear direction (Y-axis direction). At this time, the bus bar plate 230 may be formed in a shape that is flatly extended in the left and right direction and the upper and lower direction as a plate shape and erected with respect to the ground according to the arrangement direction of the electrode terminals 111 of the plurality of battery cells 100.

In addition, the bus bar plate 230 may contact the electrode terminals 111 of at least some battery cells 100 among all battery cells 100 and electrically connect them in parallel and in series.

Figure 5:
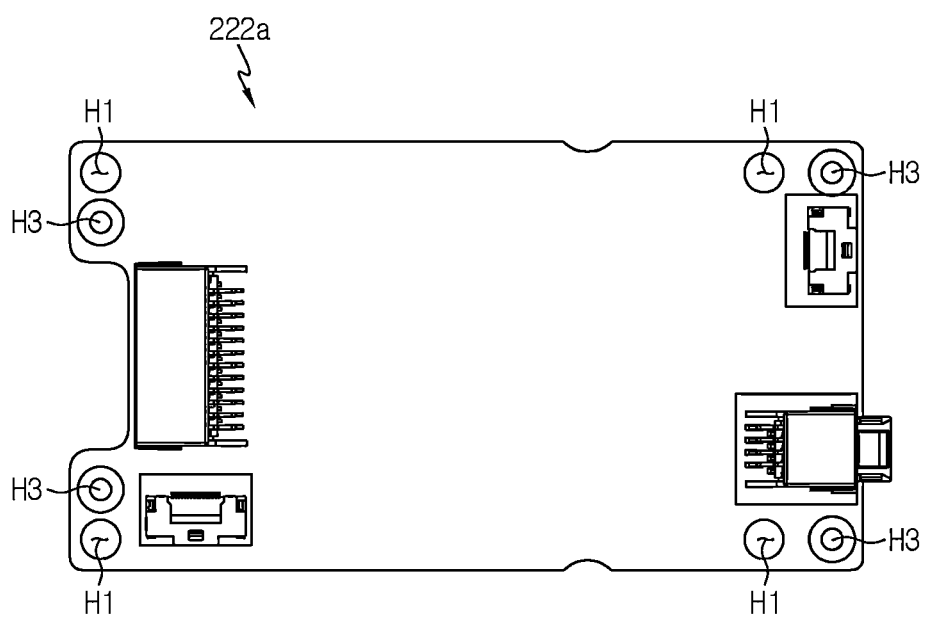
FIG. 5 is a plan view schematically showing a first printed circuit board of the battery pack according to an embodiment of the present disclosure.
Figure 6:
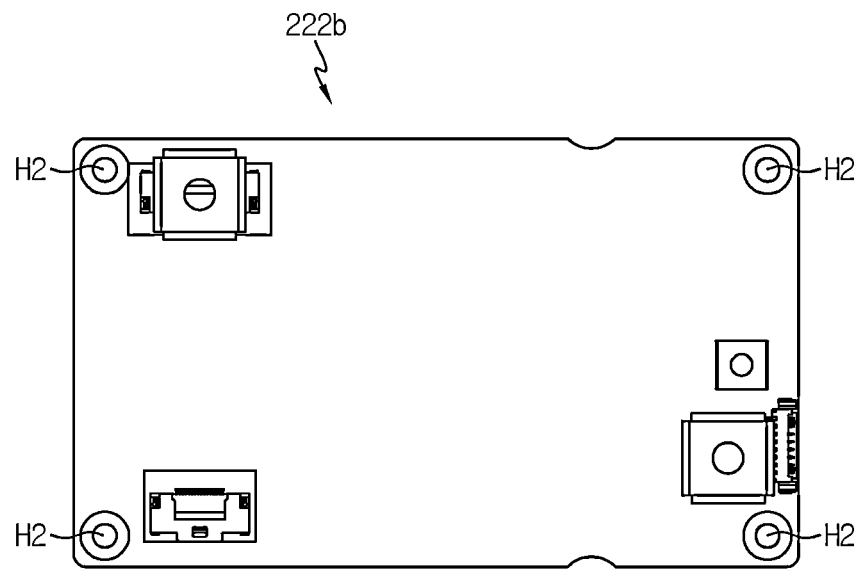
FIG. 6 is a plan view schematically showing a second printed circuit board of the battery pack according to an embodiment of the present disclosure.

FIG. 5 is a plan view schematically showing a first printed circuit board of the battery pack according to an embodiment of the present disclosure. FIG. 6 is a plan view schematically showing a second printed circuit board of the battery pack according to an embodiment of the present disclosure. Also, FIG. 7 is a partial perspective view schematically showing a pack housing of the battery pack according to an embodiment of the present disclosure.

Figure 7:
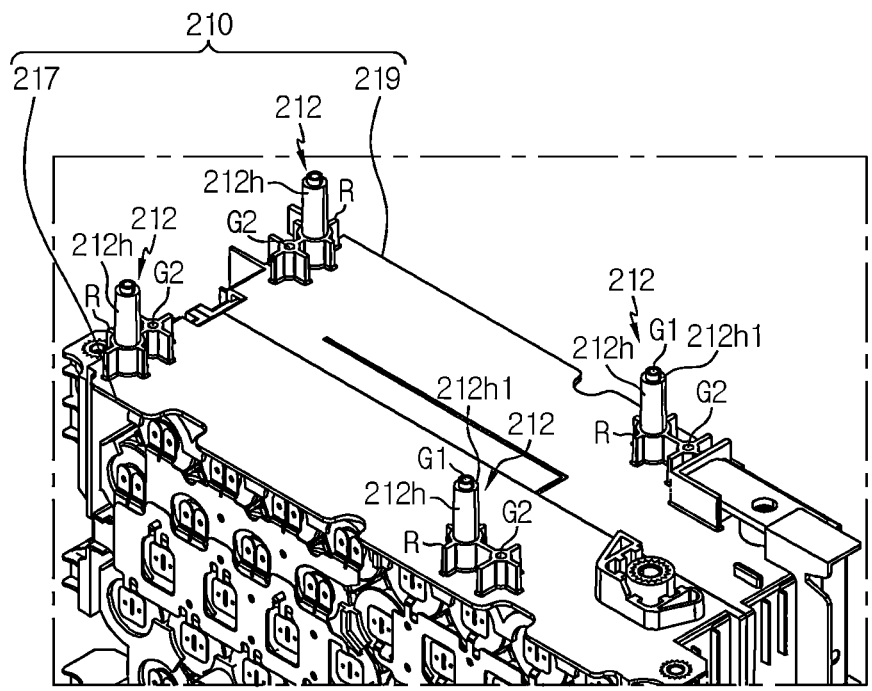
FIG. 7 is a partial perspective view schematically showing a pack housing of the battery pack according to an embodiment of the present disclosure.

Referring to FIGS. 5 and 7 along with FIG. 4, the battery management unit 220 may include a first printed circuit board 222a and a second printed circuit board 222b. Specifically, the first printed circuit board 222a may be mounted on the pack housing 210. That is, the first printed circuit board 222a may be positioned to face the upper surface of the pack housing 210.

In addition, the first printed circuit board 222a may have a plurality of first perforated holes H1 formed by being partially perforated. For example, as shown in FIG. 5, a first perforated hole H1 may be formed in each of four corners of the first printed circuit board 222a. The first perforated hole H1 may have a circular shape so that a part of the fixing unit 212 may be inserted therein. For example, as shown in FIG. 4, the first perforated hole H1 may be configured such that a part of a fixing pillar 212h of the fixing unit 212 is inserted therein.

Moreover, the second printed circuit board 222b may be disposed at a location spaced apart from the first printed circuit board 222a by a predetermined distance. The second printed circuit board 222b may be disposed so that broad surfaces of the first printed circuit board 222a and the second printed circuit board 222b face each other. The second printed circuit board 222b may have a plurality of second perforated holes H2. For example, as shown in FIG. 6, the second perforated hole H2 may be formed in each of four corners of the second printed circuit board 222b.

In addition, the second perforated hole H2 may have a hole formed so that a part of the fixing unit 212 may be inserted therein. For example, as shown in FIG. 4, the second perforated hole H2 may be configured such that a part of the fixing pillar 212h of the fixing unit 212 is inserted therein.

Referring to FIG. 7 again along with FIGS. 4, 5 and 6, the fixing unit 212 may further include at least one fixing pillar 212h and a screw T1 inserted and fastened into the at least one fixing pillar 212h. First, the fixing pillar 212h may be configured such that a body thereof passes through the first perforated hole H1 formed in the first printed circuit board 222a and the second perforated hole H2 formed in the second printed circuit board 222b, respectively.

For example, as shown in FIG. 4, four fixing pillars 212h may be provided at the upper portion of the pack housing 210. The four fixing pillars 212h may be inserted into the four first perforated holes H1 formed in the first printed circuit board 222a and the four second perforated holes H2 formed in the second printed circuit board 222b, respectively.

In addition, the fixing pillar 212h may have a mounting groove G1 formed at a longitudinal end of the body. For example, a thread may be formed at an inner surface of the mounting groove G1 so that a thread of the screw T1 may be fastened thereto.

Moreover, the screw T1 may be a fixing member configured to fix the second printed circuit board 222b to the fixing pillar 212*h*. The screw T1 may have a threaded body that is inserted and fastened into the second perforated hole H2 and the mounting groove G1, respectively. For example, as shown in FIG. 4, four screws T1 may be inserted and fastened into the mounting grooves G1 formed at ends of the four fixing pillars 212*h*, respectively. At this time, the second printed circuit board 222*b* is located on the fixing pillar 212*h*, and the screw T1 may be inserted into the second perforated hole H2 of the second printed circuit board 222*b* while being inserted into the mounting groove G1.

Therefore, according to this configuration of the present disclosure, the fixing unit 212 may securely fix the printed circuit boards 222*a*, 222*b* to the upper portion of the pack housing 210 by inserting the at least one fixing pillar 212*h* into the first perforated hole H1 and the second perforated hole H2 of the first printed circuit board 222*a* and the second printed circuit board 222*b*, respectively. Moreover, it is possible to fix the second printed circuit board 222*b* located at the upper portion of the fixing pillar 212*h* not to move by using the screw T1. Accordingly, durability of the battery pack 200 may be effectively increased.

Referring to FIGS. 5 to 7 again, the first perforated hole H1 of the first printed circuit board 222*a* may have a larger diameter than the second perforated hole H2 of the second printed circuit board 222*b*. In addition, as shown in FIG. 7, an upper longitudinal end of the fixing pillar 212*h* may have a smaller diameter than a lower end of the fixing pillar 212*h*. The fixing pillar 212*h* may be shaped to have a diameter gradually decreasing from the lower end to the longitudinal end.

Moreover, the first printed circuit board 222*a* may be located at the lower end of the fixing pillar 212*h*. The second printed circuit board 222*b* may be located at the upper end of the fixing pillar 212*h*. The first perforated hole H1 of the first printed circuit board 222*a* may have a diameter equal to or similar to the diameter of the lower end of the fixing pillar 212*h*. The second perforated hole H2 of the second printed circuit board 222*b* may have a diameter equal to or similar to the diameter of the longitudinal end of the fixing pillar 212*h*.

Therefore, according to this configuration of the present disclosure, since the first perforated hole H1 of the first printed circuit board 222*a* has a larger diameter than the second perforated hole H2 of the second printed circuit board 222*b* and the longitudinal end of the fixing pillar 212*h* has a smaller diameter than the lower of the fixing pillar 212*h*, the first printed circuit board 222*a* and the second printed circuit board 222*b* may be disposed to be spaced apart from each other by a predetermined distance just by inserting the first printed circuit board 222*a* and the second printed circuit board 222*b* into the fixing pillar 212*h*, respectively. Accordingly, it is possible to increase the assembly efficiency of the battery pack 200 and reduce production cost.

Referring to FIG. 7 again along with FIG. 4, the fixing pillar 212*h* may have a stopper 212*h*1 formed to prevent the second printed circuit board 222*b* from moving in an insertion direction. The stopper 212*h*1 may have an inner surface with a larger diameter than the second perforated hole H2 of the second printed circuit board 222*b*. The stopper 212*h*1 may have a stepped shape formed by indenting a portion of the fixing pillar 212*h*. That is, the stopper 212*h*1 may be formed by indenting the upper end of the fixing pillar 212*h* toward a central axis of the pillar. That is, the stopper 212*h*1 may have a stepped shape in which the upper end of the fixing pillar 212*h* is indented to have a smaller diameter than a middle portion thereof.

At this time, the second printed circuit board 222*b* may be interposed between the head of the screw T1 described above and the stopper 212*h*1. The second printed circuit board 222*b* may be firmly fixed on the stopper 212*h*1 by the fastening force of the screw T1.

In addition, for example, as shown in FIG. 7, the first printed circuit board 222*a* may be supported upward by a rib R extending in a cross shape. That is, the rib R may be configured to prevent the first printed circuit board 222*a* from moving downward.

Therefore, according to this configuration of the present disclosure, since the fixing pillar 212*h* includes the stopper 212*h*1 having a larger diameter than the second perforated hole H2 of the second printed circuit board 222*b*, it is possible to fix the second printed circuit board 222*b* more stably. That is, compared to the case where the fixing pillar 212*h* is formed only with a tapered structure whose diameter decreases upward, the stopper 212*h*1 formed as above may stably prevent the second printed circuit board 222*b* from moving in an insertion direction. Accordingly, the second printed circuit board 222*b* may be precisely positioned at an intended location, and the movement of the second printed circuit board 222*b* may be effectively reduced.

Referring to FIGS. 4 and 5 again, a fixing hole H3 into which a screw T2 is inserted may be formed in the first printed circuit board 222*a*. For example, as shown in FIG. 5, the fixing hole H3 into which the screw T2 is inserted may be formed adjacent to the four first perforated holes H1 of the first printed circuit board 222*a*. The fixing hole H3 may have a circular shape.

The pack housing 210 may have a fixing groove G2 formed at a position corresponding to the fixing hole H3. The fixing groove G2 may be formed to have a hole into which a part of the screw T2 inserted in the fixing hole H3 is inserted and fastened. A thread may be formed at an inner surface of the fixing hole H3 so that the thread of the screw T2 is fastened thereto.

Accordingly, the first printed circuit board 222*a* may be fixed to the upper portion of the pack housing 210 by continuously inserting the screw T2 into the fixing hole H3 and the fixing groove G2. At this time, the first printed circuit board 222*a* may be interposed between the head of the screw T2 described above and the fixing groove G2. Due to this structure, the first printed circuit board 222*a* may be firmly fixed on the fixing groove G2 by the fastening force of the screw T2.

Therefore, according to this configuration of the present disclosure, since the fixing hole H3 into which the screw T2 is inserted is formed in the first printed circuit board 222*a* and the fixing groove G2 configured so that a part of the screw T2 inserted into the fixing hole H3 is inserted and fastened is formed in the pack housing 210, the first printed circuit board 222*a* may be stably mounted and fixed on the pack housing 210. That is, the first printed circuit board 222*a* may be precisely positioned at an intended location, and the movement of the first printed circuit board 222*a* may be effectively reduced.

Figure 8:
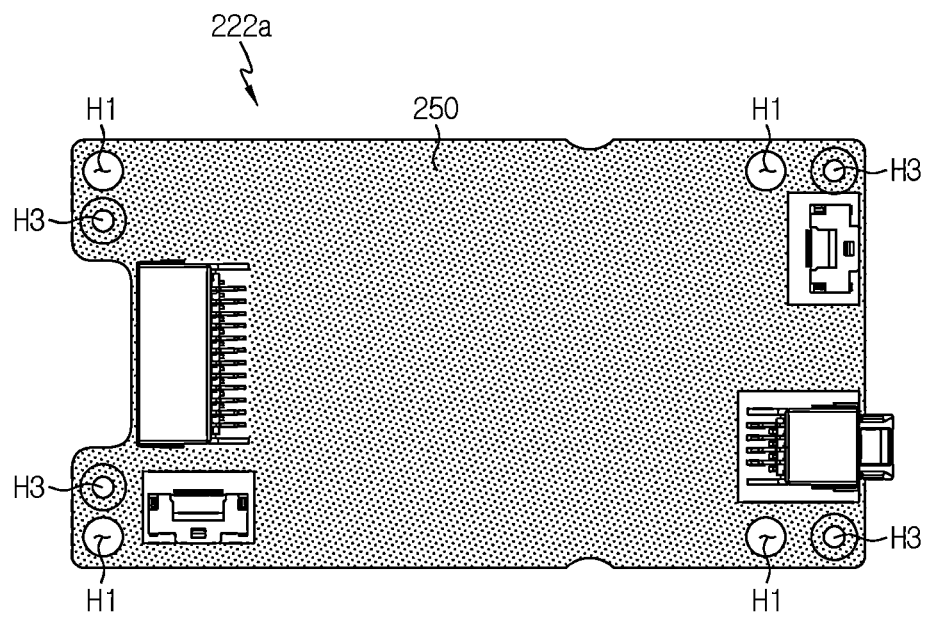
FIG. 8 is a partial perspective view schematically showing the first printed circuit board of the battery pack according to an embodiment of the present disclosure.

FIG. 8 is a partial perspective view schematically showing the first printed circuit board of the battery pack according to an embodiment of the present disclosure.

Referring to FIG. 8 along with FIG. 4, the battery pack of FIG. 8 includes the same components as the battery pack of FIG. 1, except that a coating layer 250 is further added to at least one the first printed circuit board 222*a* and the second printed circuit board 222*b*. Accordingly, in the following description of the drawings, the remaining components of the battery pack excluding the coating layer 250 will not be described in detail.

Specifically, in the battery pack of FIG. 8, the coating layer 250 may be formed on an outer surface of at least one of the first printed circuit board 222a and the second printed circuit board 222b. For example, as shown in FIG. 8, the coating layer 250 may be formed on the outer surface of the first printed circuit board 222a except for the portion where the connector is formed. However, the present disclosure is not necessarily limited thereto, and in a state where the mounted connectors and other connectors are coupled, each of the first printed circuit board 222a and the second printed circuit board 222b of the battery pack of the present disclosure may further include the coating layer 250 thereon by spraying a polymer resin on the outer surface of the coupled connectors.

In addition, the coating layer 250 may include an electric insulating material. The electric insulating material may be, for example, a polymer resin. The polymer resin may be, for example, at least one of an epoxy resin and a polyester-based resin.

Moreover, the coating layer 250 may be formed by a spraying method in which a polymer resin is sprayed onto the printed circuit board or a dipping method in which the printed circuit board is dipped into a polymer resin.

Figure 9:
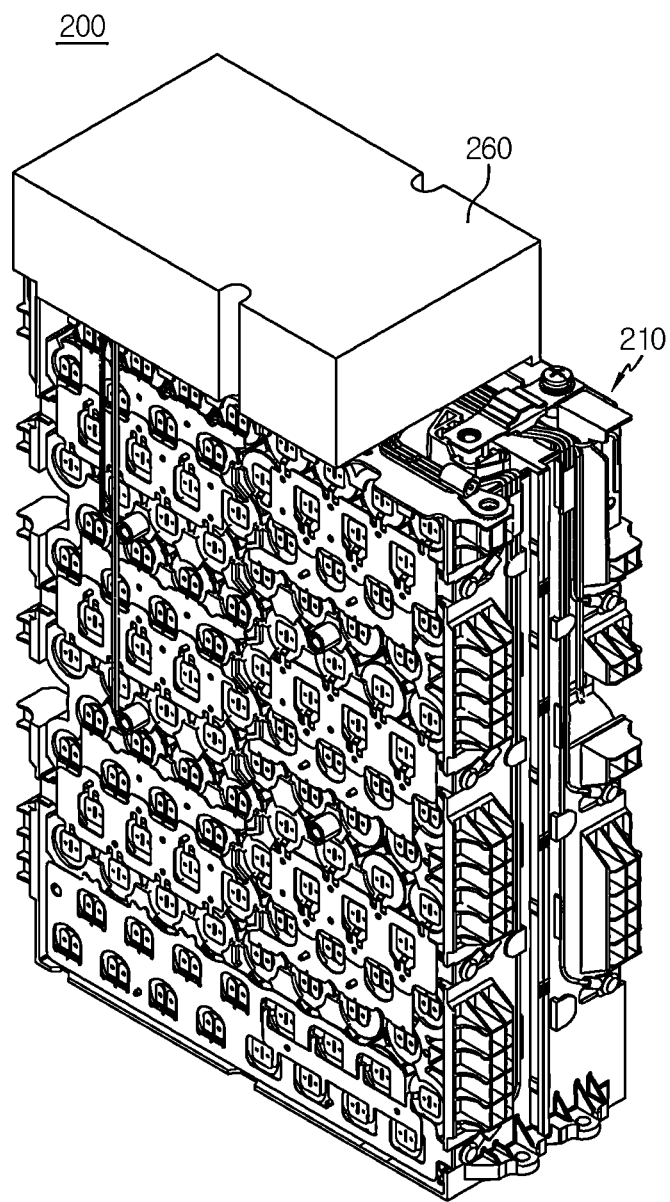
FIG. 9 is a perspective view schematically showing a battery pack according to another embodiment of the present disclosure.

Therefore, according to this configuration of the present disclosure, since the coating layer 250 is formed on at least one of the first printed circuit board and the second printed circuit board, it is possible to prevent a failure or malfunction caused by an electric short, an electric circuit interruption, an electric leakage, or the like, which occurs when a conductive external material penetrates into the battery pack to contact the first printed circuit board 222a and the second printed circuit board 222b. Accordingly, durability of the battery pack according to the present disclosure may be improved. FIG. 9 is a perspective view schematically showing a battery pack according to another embodiment of the present disclosure.

Referring to FIG. 9, the battery pack of FIG. 9 has the same components as the battery pack of FIG. 1, except that a BMS housing 260 is further included. Accordingly, in the following description of the drawings, the remaining components of the battery pack excluding the BMS housing 260 will not be described in detail.

Specifically, the BMS housing 260 may be configured to cover the first printed circuit board 222a and the second printed circuit board 222b. That is, the BMS housing 260 may have an accommodation space capable of accommodating the first printed circuit board 222a and the second printed circuit board 222b therein.

In addition, a lower portion of the BMS housing 260 may be coupled to the upper portion of the pack housing 210. For example, the lower portion of the BMS housing 260 may be bonded to the upper portion of the pack housing 210 by using an adhesive. Alternatively, although not shown, the BMS housing 260 and the pack housing 210 may be mechanically coupled using screw holes and screws.

Moreover, the BMS housing 260 may have an electric insulating material. For example, the electric insulating material may be polyvinyl chloride.

Therefore, according to this configuration of the present disclosure, since the present disclosure further includes the BMS housing 260, it is possible to prevent the first printed circuit board 222a and the second printed circuit board 222b from colliding with an external object and being damaged. In addition, it is possible to prevent a failure or malfunction caused by an electric short, an electric circuit interruption, an electric leakage, or the like, which occurs when a conductive external material penetrates into the battery pack to contact the first printed circuit board 222a and the second printed circuit board 222b. Accordingly, durability of the battery pack according to the present disclosure may be improved.

Meanwhile, an electronic device (not shown) according to an embodiment of the present disclosure includes at least one battery pack 200 described above. The electronic device may further include a device housing (not shown) having an accommodation space for accommodating the battery pack 200. For example, the electronic device may be a vacuum cleaner, a wireless cleaning robot, a wireless lawnmower, or the like. In addition, the electronic device may be equipped with an electronic system capable of checking the state of the battery pack 200 or controlling the operation of the battery pack 200.

In addition, the battery pack 200 according to an embodiment of the present disclosure may be included in a vehicle such as an electric vehicle or a hybrid electric vehicle. That is, at least one battery pack 200 according to an embodiment of the present disclosure as described above may be mounted in a vehicle body of the vehicle according to an embodiment of the present disclosure.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery pack | |
| 100: battery cell | |
| 210: pack housing | |
| 212: fixing unit | 212h: fixing pillar |
| G1, G2: mounting groove, fixing groove | 212h1: stopper |
| 220: battery management unit | |
| 222a, 222b: first printed circuit board, second printed circuit board | |
| H1, H2, H3: first perforated hole, second perforated hole, fixing hole | |
| 230: bus bar plate | |
| T1, T2: screw | |
| 250: coating layer | |
| 260: BMS housing | |

What is claimed is:
1. A battery pack, comprising:
a plurality of battery cells;
a battery management unit configured to manage charging and discharging of the plurality of battery cells and including at least two printed circuit boards electrically connected to each other and arranged such that surfaces of the at least two printed circuit boards face each other; and
an electrically insulating pack housing having an inner space in which the plurality of battery cells are accom- modated and having a fixing unit being configured to fix the at least two printed circuit boards to each other, wherein the battery management unit includes:

a first printed circuit board of the two printed circuit boards on the pack housing and having a plurality of first holes therein; and a second printed circuit board of the two printed circuit boards spaced apart from the first printed circuit board by a predetermined distance and having a plurality of second holes therein, wherein the fixing unit includes:

a plurality of fixing pillars each having a body configured to pass through a respective one of the first holes of the first printed circuit board and a respective one of the second holes of the second printed circuit board, each of the fixing pillars having a mounting groove at a longitudinal end of the body; and a plurality of screws inserted and fastened into a respective one of the second holes and a respective one of the mounting grooves to fix the first printed circuit board and the second printed circuit board to a respective one of the fixing pillars, respectively.

2. The battery pack according to claim 1, wherein a diameter of each respective one of the first holes of the first printed circuit board is larger than a diameter of each respective one of the second holes of the second printed circuit board, and wherein, for each of the fixing pillars, a diameter of the longitudinal end is smaller than a diameter of a lower end thereof.

3. The battery pack according to claim 2, wherein each fixing pillar includes a stopper having a larger diameter than the diameter of the respective second hole of the second printed circuit board.

4. The battery pack according to claim 1, wherein the first printed circuit board has fixing holes, and the pack housing has fixing grooves, and wherein the screws are each respectively inserted into a respective one of the fixing holes and fastened to a respective one of the fixing grooves.

5. The battery pack according to claim 1, wherein at least one of the first printed circuit board and the second printed circuit board includes an electrically insulating coating layer on an outer surface thereof.

6. The battery pack according to claim 1, further comprising:

a BMS housing configured to cover the first printed circuit board and the second printed circuit board.

7. An electronic device, comprising the battery pack according to claim 1.

8. A vehicle, comprising the battery pack according to claim 1.

* * * * *